US 7,756,537 B2

(12) United States Patent  
Laurila et al.

(10) Patent No.: US 7,756,537 B2  
(45) Date of Patent: Jul. 13, 2010

(54) GROUP DETAILS OF GROUP SERVICES

(75) Inventors: Antti Laurila, Helsinki (FI); Jari Mutikainen, Helsinki (FI); Paavo Helenius, Toijala (FI); Simo Veikkolainen, Espoo (FI)

(73) Assignee: Nokia Corporation, Espoo (FI)

( * ) Notice: Subject to any disclaimer, the term of this patent is extended or adjusted under 35 U.S.C. 154(b) by 756 days.

(21) Appl. No.: 11/220,855

(22) Filed: Sep. 8, 2005

(65) Prior Publication Data

US 2006/0053208 A1 Mar. 9, 2006

(30) Foreign Application Priority Data

Sep. 8, 2004 (FI) .................................. 20041169  
Jan. 28, 2005 (FI) .................................. 20050092

(51) Int. Cl.  
*H04B 7/00* (2006.01)  
*H04Q 7/20* (2006.01)

(52) U.S. Cl. ........................ 455/517; 455/518; 455/416; 455/414.2

(58) Field of Classification Search ................. 455/517, 455/518, 519, 520, 521, 415, 416, 509, 452.1, 455/450, 456.1, 414.2, 414.1; 370/353, 328, 370/352; 709/227, 204  
See application file for complete search history.

(56) References Cited

U.S. PATENT DOCUMENTS

| | | | |
|---|---|---|---|
| 6,516,200 | B1 | 2/2003 | Schmidt et al. |
| 2002/0150091 | A1 | 10/2002 | Lopponen et al. |
| 2003/0096621 | A1* | 5/2003 | Jana et al. .................... 455/456 |
| 2003/0097436 | A1* | 5/2003 | Clow et al. ................... 709/223 |
| 2003/0153342 | A1 | 8/2003 | Crockett et al. |
| 2004/0137882 | A1* | 7/2004 | Forsyth .................... 455/414.1 |
| 2004/0224710 | A1 | 11/2004 | Koskelainen et al. |
| 2005/0186970 | A1* | 8/2005 | Yates et al. ............... 455/456.5 |
| 2005/0287982 | A1* | 12/2005 | Brewer et al. ............... 455/405 |
| 2007/0275747 | A1 | 11/2007 | Blicker et al. |

FOREIGN PATENT DOCUMENTS

| | | |
|---|---|---|
| WO | WO 01/31968 A1 | 5/2001 |
| WO | WO 03/069928 A1 | 8/2003 |
| WO | WO 2004/012421 A1 | 2/2004 |

OTHER PUBLICATIONS

Comneon, Ericsson, Motorola, Nokia, Siemens -Architecture V2.0. 8, "Push-to-talk over Cellular (PoC); Architecture; PoC Release 2.0", Jun. 2004, pp. 1-49.

(Continued)

*Primary Examiner*—John Lee  
(74) *Attorney, Agent, or Firm*—Ditthavong Mori & Steiner, P.C.

(57) ABSTRACT

A server for a communication system is disclosed. The server is configured to receive group communication information comprising a group detail indicator. The group detail indicator provides information on at least an identity of a group and a type of the group. The server is further configured to store the group communication information, and to make the group communication information available to predefined entities.

31 Claims, 2 Drawing Sheets

OTHER PUBLICATIONS

Open Mobile Alliance (OMA) OMA-RD_PoC-V1_0-20040628-C, Push to Talk over Cellular Requirements, version 1.0—Jun. 28, 2004.
IETF RFC 2327 "SDP: Session Description Protocol", M. Handley et al., Apr. 1998, pp. 1-40.
IETF RFC 3261 "SIP: Session Initiation Protocol", J. Rosenberg et al., Jun. 2002, pp. 1-252.
Russian Office Action for corresponding RU Application No. 2007112481/09(013547), Aug. 14, 2009, Russia.
Translation of Chinese Office Action for corresponding CN Application No. 200580035655.1, Jun. 26, 2009, China.
Translation of Japanese Office Action for corresponding JP Application No. 2007-530726, Aug. 4, 2009, Japan.
Non-final office action for U.S. Appl. No. 10/979,400 dated Jan. 14, 2010.

* cited by examiner

GROUP DETAILS OF GROUP SERVICES

FIELD OF THE INVENTION

The invention relates to communication systems, and more particularly to communication systems providing group communication, such as direct voice communication sessions or instant messaging. In particular, the invention relates to providing information on group details relating to group communication.

BACKGROUND OF THE INVENTION

A communication system can be seen as a facility that enables group communication between two or more entities such as user terminal and/or other nodes associated with the communication system. Subscribers, such as the users or end-users, to a communication system may be offered and provided numerous services, such as calls, data communication or multimedia services or simply an access to a network, such as the Internet. The services may be offered by an operator of the communication system or by an external service provider.

A communication system typically operates in accordance with a given standard or specification setting out what the various entities associated with the communication system are permitted to do and how that should be achieved. A standard or specification may define a specific set of rules, such as communication protocols and/or parameters, on which connections between the entities can be based.

Examples of communication systems may include fixed line communication systems, such as a public switched telephone network (PSTN), wireless communication systems, e.g. global system for mobile communications (GSM), general packet radio service (GPRS), universal mobile telecommunications system (UMTS), wireless local area network (WLAN) and so on, and/or other communication networks, such as an Internet Protocol (IP) network and/or other packet switched data networks. Various communication systems may simultaneously be concerned in a connection. An end-user may access a communication network by means of any appropriate communication device, such as user equipment (UE), a mobile station (MS), a cellular phone, a personal digital assistant (PDA), a personal computer (PC), or any other equipment operable according to a suitable network protocol, such as a Session Initiation Protocol (SIP) or a wireless applications protocol (WAP) or a hypertext transfer protocol (HTTP). The user equipment may support, in addition to call and network access functions, other services, such as short message service (SMS), multimedia message service (MMS), electronic mail (email), Web service interface (WSI) messaging and voice mail.

Services offered to subscribers of a communication system may comprise conferencing services, such as multiparty conferencing, for example, so-called direct voice communication services. The direct voice communication service may allow users to engage in immediate communication with one or more users. One example of the direct voice communication services may comprise the "push-to-talk over cellular" (PoC) service also known as the PTT (push-to-talk service). The PoC may be based on Voice over IP (VOIP) technology in cellular networks, such as the GSM/GPRS network.

Services offered to subscribers of a communication system may comprise instant messaging. The instant messaging communication service may allow users to send messages with one or more users. The instant messaging refers to the transfer of messages between users in near real-time. These messages are usually, but not required to be, short. Instant messages are often used in a conversational mode, that is, the transfer of messages back and forth is fast enough for participants to maintain an interactive conversation. A sent message may be just a plain text or it may contain some payload such as picture or application.

The direct voice communication services may use capabilities of, for example, the Internet Protocol Multimedia Subsystem (IMS), which is an example of a system providing multimedia services. The IMS enables IP connections for a communication device and other parties to the communication, such as other communication devices or entities associated with the network. The third generation partnership project (3GPP) has defined use of the GPRS for offering IP connectivity to IMS services.

Patent Application U.S. 2002/0150091, filed on 17 Apr. 2001, in the name of Lopponen et al., discusses about a packet mode, e.g. IP, group communication service layer provided on top of a standard mainstream cellular network.

US Patent Application, filed on 23 Aug. 2004, claiming priority from FI 20040577 (23 Apr. 2004), in the name of Poikselka et al., discusses about providing information on a resource in a communication system, such as whether the resource comprises an individual user identity or a plurality of user identities.

Open Mobile Alliance (OMA) OMA-RD_PoC-V1_0-20040628-C, Push to Talk over Cellular Requirements, version 1.0—28 Jun. 2004, defines the PoC, which is based on half-duplex communications. Thus, one user subscribing the PoC service, i.e. a first PoC subscriber, and belonging to a group may speak at the time and the other users, or PoC subscribers, belonging to the group may listen, but may not talk at the same time. The first PoC subscriber may select a person or groups of persons to talk to, for example, from a directory or the like provided in a communication device the first PoC subscriber is using. The first PoC subscriber may press and hold a push-to-talk key on the communication device to start talking. The first PoC subscriber can now talk for as long as the first PoC subscriber holds the key. The push-to talk key may be a specific button, tangent or any other appropriate key in a user interface. Similar principles apply with devices having touch sensitive or sound activated user interfaces. Bi-directional communication may be offered since all parties of the communication session may similarly communicate voice data with the PoC application server, which is an example of an entity controlling the PoC session. As soon as the first PoC subscriber releases the push-to-talk key, another member of the group may reserve a turn to speak. A turn to speak may be requested by pressing the push-to-talk key. The PoC application server or another controlling entity may grant a turn to speak on a first come first served basis or based on priorities. Talk bursts in the PoC conferences are usually connected without the recipient answering and typically received through a built-in loud speaker of a communication device.

In a group communication, a party which is the target of a connection attempt, namely the called party or recipient, might need or want to receive identity of an initiating party, namely the calling user identity, and also a group identity (group ID) of the group into which the called party is intended to participate.

For example, in the PoC system, a PoC client, such as software in a communication device, may use a group identity for learning or determining other members in the group and performing joining the group.

In addition to the group identity, a recipient client may need or want to learn details on the group. For example, in many group services, there are several types of groups that behave in different manners from a point of view of an end user. For example, the OMA-RD_PoC-V1_0-20040628-C, paragraph 6.1.2 defines following three group types: ad-hoc, pre-arranged and chat.

A group, such as an ad-hoc and chat group, may be temporary. The recipient client should not store a group ID of a temporary group, as the group ID may not be valid after the session to which the group ID relates is over. On the other hand, persistent groups also exist, pre-arranged PoC group being an example. A recipient client may store a group ID of a persistent group for later use, e.g. to initiate a new session.

It might be advantageous to a recipient client to learn the group type. For example, the recipient client might thus be able to decide whether the group ID should or need to be stored and how the group ID may be used.

So-called Industry Consortium Specifications [Push-To-Talk over Cellular (PoC); Signaling Flows—UE to Network Interface (UNI) and Push-To-Talk over Cellular (PoC) Signalling Flow—Network-to.Network interface (NNI); PoC Release 2.0] use a "From" to transport the calling party identity when the talk session is an instant personal talk or an ad-hoc instant group talk. When the talk session is an instant group talk or a chat group talk then a "From" header transports the group identity of the group. A "Referred-By" header is used to transport the calling party address in case of an instant group talk or to a chat group talk. The problem in this approach may be that a recipient cannot trust to information given in the "From" header, as a sending client or end user may be able to fill the "From" header freely without a Session Initiation Protocol (SIP) network, such as IMS, validating the "From" header. Also, use of the "Referred-by" header outside of the context of a REFER method may be against SIP principles.

It shall be appreciated that these issues are not limited to any particular communication environment, but may occur in any appropriate communication system.

SUMMARY OF THE INVENTION

Embodiments of the invention aim to address one or several of the above problems or issues.

In accordance with an aspect of the invention, there is provided a server for a communication system. The server is configured to receive group communication information comprising a group detail indicator, wherein the group detail indicator provides information on at least an identity of a group and a type of the group. The server is further configured to store the group communication information. The server is further configured to make available the group communication information to predefined entities.

In accordance with another aspect of the invention, there is provided a communication device. The communication device comprises memory means for storing a group detail indicator wherein the group detail indicator provides information on at least an identity of a group and a type of the group. The communication device further comprises uploading means for uploading the group detail indicator to a server. The communication device further comprises downloading means for downloading the group detail indicator for storing the group detail indicator to the memory means.

BRIEF DESCRIPTION OF THE DRAWINGS

The invention will now be described in further detail, by way of example only, with reference to the following examples and accompanying drawing, in which.

DETAILED DESCRIPTION OF PREFERRED EMBODIMENTS

Figure 1:
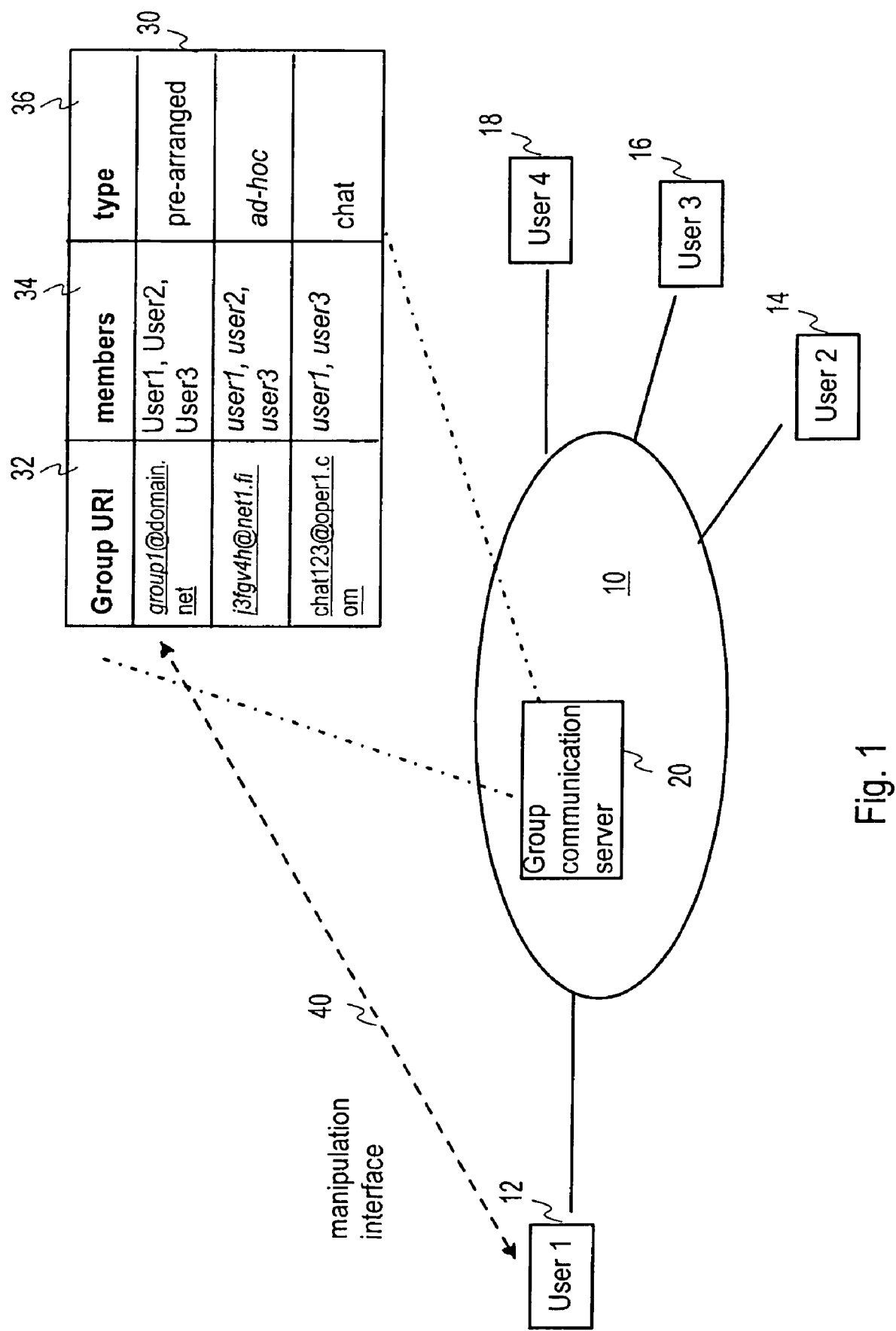
FIG. 1 shows an example of an arrangement in which the embodiments of the invention may be implemented.

FIG. 1 shows an example of an arrangement including a communication network 10 providing group services, a first communication device 12, a second communication device 14, a third second communication device 16 and a fourth second communication device 18, each of said communication devices 12, 14, 16, 18 capable of using group services.

A user of a communication device, for example the first communication device 12, may participate in group communication with another group user, for example a user using the second communication device 14. In an alternative, a user of a communication device, for example the first communication device 12, may participate in group communication with a group, for example with a group comprising the second communication device 14 and the third communication device 16. A user may participate in more than one group at a time. A user may receive notifications of groups available to participate in and may request to join those groups. A user may also receive invitations to participate in groups.

Furthermore, a group communication server 20 is shown in FIG. 1. The group communication server 20 is an entity controlling group communication and supporting creation and management of group lists. Operation of the exemplifying group communication server shall become illustrated in the following description.

It shall be appreciated that FIG. 1 is only an example showing four individual devices and one group communication server. The number and type of these entities may differ substantially from that which is shown. A communication system is typically arranged to serve a plurality of communication devices. The group communication may comprise group communication sessions, such as conferencing sessions, and instant messaging. In an embodiment, the group services comprise PoC services. In an embodiment, the communication network 10 shown in FIG. 1 is a session initiation protocol (SIP) controlled network. Further, in an embodiment, the communication network 10 is provided at least in part by the Internet multimedia subsystem (IMS). In an embodiment, a general packet radio service (GPRS) based system is used as a backbone communication network enabling the IMS services. Another appropriate mobile communication system may be used as well.

A mobile communication network may logically be divided into a radio access network (RAN) and a core network. The core network entities typically include various control entities and gateways for enabling communication via a number of radio access networks and also for interfacing a single communication system with one or more communication systems, such as with other cellular systems and/or fixed line communication systems.

The IMS, among other systems, may use the Session Initiation Protocol (SIP), which is an application layer control protocol defined by the Internet Engineering Task Force (IETF) for creating, modifying and terminating sessions with one or more participants. The SIP is defined in the document IETF RFC 3261 "SIP: Session Initiation Protocol". A user connected to a SIP base communication system may communicate with various entities of the communication system based on standardized SIP messages. Communication devices or user who run certain applications on the communication devices are registered with the SIP backbone so that an invitation to a particular session can be correctly delivered to these end points. The SIP provides a registration mechanism for devices and users and it applies mechanisms such as location servers and registrars to route the session invitations appropriately.

Uniform Resource Identifiers (URIs) are used to identify different types of actors in a SIP-controlled network. Typically a URI points to a registered user identity of an individual user. A URI may identify also services, such as voicemail server or conference factory URI, conferencing instances, such as chat rooms or voice-over-IP (VoIP) conferencing instances, or other types of resources. In addition, a URI may point to a resource list, which may be a list of individual URIs, or in other words, a group of URIs. Resource lists may be used in many applications, such as for one-to-many messaging, and so on. For example, a server in a network may maintain resource lists of e.g. one operator. A request addressed to such a resource list may be routed to the server, which may forward the request to individual contacts behind the resource list.

In this specification, terms user, end-user, user agent, subscriber and resource all refer to an entity able to using services via a communication network. A user or user agent is typically an individual registered user identity. Term end-user may be used to denote a human user of the system. A subscriber or resource may refer to an individual user or to a group of users subscribing a single subscription. Terms resource list and group define herein an entity having an own identifier, such as an own URI, and comprising a number of entities each having a different identifier, such as a different URI.

As explained above, a recipient client may need or want to know a group type in addition to a group identity. Three exemplifying group types were mentioned: ad-hoc, pre-arranged and chat group. Group types may further comprise one-to-one (1-to-1) type and other defined or undefined types. A group of communication devices for multiparty conferencing, such as the PoC, can be created in various ways. For example, the SIP or a conference policy control protocol (CPCP) may be used.

An ad-hoc group is temporary. The recipient client should not store a group ID of an ad-hoc group, as the group ID is not valid after the group communication to which the group ID relates is over. An ad-hoc group communication may be established when a first PoC subscriber selects more than one other PoC subscribers and invites them to participate in an ad-hoc group communication. Voice communication may be started after one other PoC subscriber the first PoC subscriber invited, i.e. a second PoC subscriber, accepts the invitation. To participate in an existing ad-hoc PoC group session, a new participant typically needs an invitation from a current ad-hoc PoC group session participant. An exception is that a PoC subscriber, who was a participant of the ad-hoc group session, but left the session, may join in again without an invitation. In such a case, the group ID may need to be stored temporarily.

A chat PoC group session is established when a first PoC subscriber joins in. Voice communication is possible at the time the chat PoC group session is established. A PoC subscriber may establish a chat PoC group session or join into an ongoing chat PoC group session.

On the other hand, a pre-arranged group is persistent. A recipient client may store a group ID of a pre-arranged group for later use, e.g. to initiate a new group communication. Participation in a pre-arranged group is restricted to the members of the group. The members may be invited to a pre-arranged PoC group session or may join an ongoing session. A PoC session between pre-arranged PoC group members may be established when any individual member of the same pre-arranged PoC group invites the group. Voice communication may be started after one other PoC subscriber the first PoC subscriber invited, i.e. a second PoC subscriber, accepts the invitation.

Embodiments of the present invention provide new alternatives for informing group details, including at least a group identity and group type, to a called party in a group communication. In an embodiment, other type of information may additionally be provided.

The group communication server 20 shown in FIG. 1 may be used for implementing embodiments of the invention. The group communications server 20 may comprise information on groups relating to or capable of having a group communication session or capable of instant messaging. Such information may be illustrated by means of a group table 30 as shown in FIG. 1. The group table may identify a group, for example, by means of a group URI 32. Each group URI 32 may comprise a number of members 34. A type 36 of the group, for example pre-arranged, ad-hoc, chat, 1-to-1 or other, is defined.

Furthermore, a manipulation interface 40 is shown in FIG. 1. The manipulation interface may allow a user to create and manage group lists, for example, using a communication device or a web page. For example, the user may determine a pre-arranged group to be stored in the group table 30.

In embodiments of the invention at least one request to initiate group communication comprising a group detail indicator is created. The group detail indicator provides information on at least an identity of a group of communication devices and a type of the group. The group detail indicator is provided to at least one communication device of the group. In an embodiment, a request to initiate the group communication, or shortly an originating request, may be received in a server, e.g. a controlling server, or other such entity. The originating request may be received from an originating or initiating party, such as a communication device wishing to initiate group communication. The server or other such entity may create the at least one request to initiate the group communication comprising the group detail indicator using the originating request the entity received from the initiating party. In an embodiment, the entity may detect that the originating request relates to a group and determine the type of the group.

Examples of group communication servers may comprise, but are not limited to, a PoC server or a PoC service enabler and a conference server. A network may comprise a separate element for storing and managing contact lists, group lists and access lists. Examples of such elements may comprise, but are not limited to, a Group/List Manager Server (GLMS) and an Extensible Mark-up Language (XML) Document Management Server (XDMS). A group communication server 20 may retrieve group lists (including group type) from separate elements, such as GLMS and XDMS. The type of the group may define a type of the group communication server storing information relating to the group. For example, a PoC server may store application specific group lists, such as ad-hoc conference URIs and members created by the CPCP. An XMDS may store general URI lists which may be shared by multiple applications, for example. In an embodiment, the server controlling the group communication may be able to determine the type of the group using information on a lifetime of the group or configured information at the server.

XML Document Management (XDM) is a generic framework for group and list management called based on XML Configuration Access Protocol (XCAP). The XDM defines a common mechanism that makes information accessible to the different enablers that need them. The information is expected to be stored in the network. In the network, the information may be located, accessed and manipulated, e.g. created, changed and deleted, by authorised principals. A client may be able to identify elements inside one XML document and modify only the elements needed to be modified.

An URI list may be shared between multiple enablers. For example, a principal may group together a number of end users, e.g. "Friends" or "Family", or other resources. Such an URI list may be reused by a number of different enablers, such as PoC and Presence service enablers.

Figure 2:
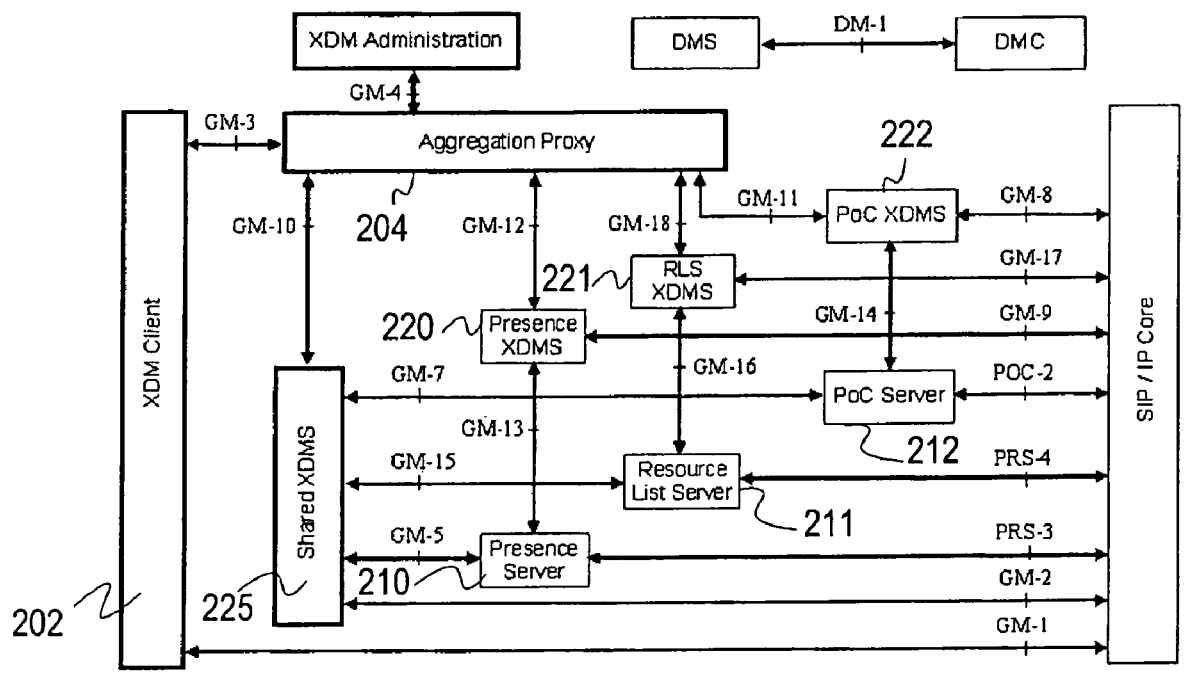
FIG. 2 shows an example of a further arrangement in which the embodiments of the invention may be implemented.

FIG. 2 shows and exemplifying XDM architecture as defined in Open Mobile Alliance, Group Management Architecture, Draft Version 1.0—18 Nov. 2004, OMA-PAG-GM-AD-V1_0-20041118-D. Main components of the XDM architecture may comprise an XDM client 202, an aggregation proxy 204, application servers 210, 211, 212 and XDM Servers (XDMS) 220, 221, 222, 225. The aggregation proxy 204 acts as contact point for XCAP requests from a XDM client 202. The aggregation proxy 204 may authenticate and route the requests to a correct XDMS 220, 221, 222, 225.

A PoC XDMS 222 may contain PoC access policy documents and PoC group documents. Each PoC user may have one access policy document, which may be used for controlling incoming PoC session invitations. PoC group documents may be used to control group sessions. A presence XDMS 220 may contain authorization policy documents, which may be used to authorize watcher subscribing presence information. Furthermore, the presence XDMS 220 may contain resource list server (RLS) presence list documents, which may be used to subscribe with one request presence of listed users.

The XDM client 202 may store URI lists to the shared XDMS 225, which may be then shared between multiple applications. Client may create a shared URI list to the shared XDMS 225 and add to a PoC group document a reference to the shared URI list. The shared URI list in the shared XDMS 225 can be used as member list of a group. The same shared URI list can be referenced also from an RLS document. In addition, the shared XDMS 225 can be used to share URI lists (contact information) between multiple devices hold by the same user. For example, when the user takes a new device into use, the new device may receive service settings, for example, Over-the-air. Subsequently, all the information stored in local XDM servers is available to the new device. Thus, the information stored into the local XDM servers does not need other synchronization mechanisms to be synchronized between the devices owned by the user.

The shared URI list may be an XML document. The XDM client 202 may manipulate an XML document by invoking predefined HTTP operations on an XDM server identified in a Request-URI of an HTTP header. The XDM client 202 may construct the Request-URI based on application usage knowledge governing said XML document. Examples of manipulating XML documents are given in Open Mobile Alliance, PoC XDM Specification, Draft Version 1.0—19 Jan. 2005, OMA-TS-PoC_XDM-V1_0-20050119-D, Appendix B, paragraph B.1.

A user or an application server 210, 211, 212 can subscribe to changes in the XML documents. A SIP URI of an owner of the shared URI list or by a public service identity (PSI) URI of the group associated with the shared URI list may be used fro subscribing.

Information relating to groups is shown in a form of a group table in FIG. 1. However, a group table is only an illustrating example. The group communication server 20 may use various ways of handling data relating to groups, for example directories, lists, additional servers and so on. Typically, a group communication server 20 handles a plurality of groups at a time. The communication network 10 may comprise multiple group service providers each having one or more group communication servers.

In an embodiment, a new URI parameter, in addition to the group identity carried by the URI, may be defined for transporting the group type. This new URI parameter may be named, for example, a group type parameter. According to this embodiment, the group type parameter may be added in the end of a URI in appropriate SIP message header(s), such as the Contact, To, From or P-Asserted-Id header, to indicate the type of the group to which the URI points.

A new URI parameter according to an embodiment of the invention may be defined, for example, in one of the following ways:

Header: <group-URI; group=grouptype>; or
Header: <group-URI>; group=grouptype where the "group-URI" denotes a base uniform resource identifier providing the identity of the group and the "group" denotes the new URI parameter according to an embodiment of the invention, wherein the "grouptype" gets a value of the type of the group, e.g. chat, ad-hoc, pre-arranged, 1-1, other. Any other words or text string or combination of characters or bit string could be used instead of "group" or "grouptype" to achieve the intended function.

An example of a new URI parameter according to an embodiment of the invention may comprise:

Contact: <sip:myfriends@example.com; group=pre-arranged>; or
Contact: <sip:myfriends@example.com>; group=pre-arranged In a similar manner the group type may be defined as a new header parameter or attached to any existing SIP header.

In an embodiment, a new SIP header may be defined for transporting the group details. RFC 3261, paragraph 7.3 defines the SIP header fields. Each header field consists of a field name followed by a colon and the field value. The format of a header field-value is defined per header-name, which may be text or a combination of whitespace, tokens, separators, and quoted strings.

A new SIP header, which may be denoted by "Group-ID" or any other selected word or text string or combination of characters or bit string, according to an embodiment of the invention may be defined, for example, in the following way:

Group-id: group-URI; group-type where the "group-URI" field contains the group identity, such as a SIP URI (session initiation protocol uniform resource identifier) or TEL URI (telephony uniform resource identifier) identifying the group, e.g. myfriends@example.com. In an embodiment, it may be possible to transport also a display name associated to the group identity. The "group-type" field contains the type of group, e.g. chat, ad-hoc, pre-arranged, 1-to-1, other.

An example of a new SIP header according to an embodiment of the invention may comprise:

```
Group-id: "Miikka's friends" <sip:myfriends@example.com>;
pre-arranged
```

In an embodiment, the SIP header may also be a so-called private SIP header. In this embodiment, the syntax of the SIP header may be

```
P-Group-id: group-URI; group-type
```

In a further embodiment, the group details may be transported in an extended mark-up language (XML) payload. The OMA-RD_PoC-V1_0-20040628-C, e.g. paragraph 6.2.1, defines a group advertisement (GA) operation. The GA may be used to advertise existence of group to recipients. The GA is a stand-alone operation, which does not initiate communication other than transferring the group advertisement itself. A structure of the GA may carry the group ID (SIP or TEL URI) and the group type. In an embodiment of the invention, a data structure carrying the group detail indicator, namely the group ID and the group type, in an extended mark-up language payload attached to a request to initiate a group communication session, is used to make the recipient client aware of the group details in the received group session or message. The request to initiate the group communication session may comprise an invitation request or a stand-alone message of the session initiation protocol, i.e. both SIP INVITE and MESSAGE.

An example of an XML payload according to an embodiment of the invention may comprise:

```
Content-Type: application/vnd.poc.groupdetails+xml
Content-Length: 151
<?xml version="1.0" encoding="UTF-8"?>
<group>
    <uri>sip:group.uri@domain.net</uri>
    <name>Group Display Name</name>
    <type>pre-arranged</type>
</group>
```

A Session Description Protocol (SDP) is a session description protocol for multimedia sessions defined, for example, in the document IETF RFC 2327 "SDP: Session Description Protocol". The SDP may be used for communicating existence of a session and conveying sufficient information to enable joining and participating in the session. The SDP may include session name and purpose, time(s) the session is active, the media comprising the session and information to receive those media (addresses, ports, formats and so on) and, optionally, information about the bandwidth to be used by the conference and contact information for the person responsible for the session.

In a further embodiment of the invention, a new SDP attribute may be defined for transporting the group details. Such a new SDP attribute may be named a group ID SDP attribute and may have the following form:

```
a=poc-group-id: group URI; group type
group URI = SIP URI or TEL URI of the group
group type = ad-hoc, pre-arranged, chat, 1-1, other
```

An example of a new SDP attribute may comprise:

```
a=poc-group-id: myfriends@example.com; pre-arranged
```

In the following, examples are described on the use of a group detail indication according to embodiments of the invention. A controlling PoC server is a server, which knows or is able to retrieve a type of a group and is able to insert it to outgoing requests.

In an embodiment, Alice wants to create an ad-hoc group. She sends an INVITE request to her PoC server. The request contains other users to be invited. Alice's PoC server will take the role of controlling PoC server. The controlling PoC server thus knows that Alice wants to create an ad-hoc group. The controlling PoC server uses a list of users provided in the request to invite said users. When the controlling PoC server invites other members using SIP INVITE, the controlling PoC server includes information about the group identity (SIP URI) and the group type. Eventually, the request is received by the invited users, i.e. called parties. When a PoC client of a called party receives the request, the PoC client could display to an end-user that the incoming session is an ad-hoc group session, as the request contains the type of session, and further that the initiator is Alice. Moreover, as the request contained the group identity, the PoC client is able to make subscription to the participant information.

In another embodiment, Alice wants to reach members of pre-arranged group. She sends an INVITE request to her PoC server. The request contains the address of pre-arranged group. The request is routed to a PoC server hosting the pre-arranged group. The PoC server hosting the pre-arranged group will fetch the members of the pre-arranged group and invites the other members than Alice. The PoC server hosting the pre-arranged group Will take the role of a controlling PoC server. When the controlling PoC server invites other members using SIP INVITE the controlling PoC server includes information about the group identity (SIP URI) and the group type. Eventually, the request is received by the invited users, i.e. called parties. When a PoC client of a called party receives the request, the PoC client could display to an end-user that the incoming session is from a pre-arranged group, as the request contains the type of session, and further that the initiator is Alice. Moreover, as the request contained the group identity, the PoC client is able to make subscription to the participant information.

A communication device, such as User Equipment (UE), of a user may implement additional features utilising the group type indication to improve the user-friendliness of the UE. Examples of such features may comprise for example following situations. In an embodiment, if a user tries to store in a phonebook of the UE a SIP URI, which is an "ad hoc" type of SIP URI, the UE may tip the user off about the SIP URI being a temporary address by displaying a warning. Furthermore, the UE may ask whether the user really wants to store said SIP URI in the phonebook. In an embodiment, the group type may be stored in a phonebook of the UE.

Further, a user may miss a call, for example, because the user didn't hear the phone ringing. The user might also miss an invitation to a group session. When the user next time checks the UE, the user can see all the missed calls in a so-called missed call log of the phone. This makes it easy to call back to missed numbers. In an embodiment, if the missed call was an invitation to a group session, the group type may also be seen in the missed call log.

In an embodiment, the UE may display group type information to a user when the UE receives a session invitation. This allows for instance to distinct 1-1 calls from group calls. Moreover, the user may have different ringing tones or handling for different kind of sessions.

For example, a user may receive an invitation request from the network but does not answer. Later, when the user checks the UE, the user may note that a call has been missed and may attempt to call back. Knowing that a URI to be invited is a pre-arranged group type the UE of a user may warn the user when the user dials the pre-arranged group identity. This may be advantageous, as the pre-arranged group identity triggers 1 to N new calls in the server and may cause significant charges for the user.

In a further example, a group, e.g. myfriends@example, may comprise users A, B, C, D and E. The user A may send a request to initiate a group communication, such as a SIP MESSAGE, to the group. The user B may get information that the request was sent by the user A and that the group in question is a pre-arranged group. Thus, the user B knows that calling said group triggers 1 to N new calls in the server and may cause significant charges for the user.

A user can receive address of the group in the group advertisement (GA). The user may save the address of the group locally to a communication device the user is using. It has now been found that the address of the group should be able to be saved also to a network server, such as the shared XDMS 225. The user may thus be able to share address of the group among multiple devices. This may be advantageous when user wants to change the communication device or use several devices simultaneously.

In an embodiment, the group type parameter according to the invention is be added to the shared XDMS 225 of FIG. 2. This allows saving also groups to the shared XDMS 225 and separating a group URI from a SIP URI, which defines only a single SIP user instead of group.

In an embodiment, user may save a received group URI to the shared XDMS 225. In the shared XDMS 225, the group type parameter according to the invention is used to differentiate a group URI from an URI pointing to an individual contact. To maintain the very same information between phonebook applications of two devices, such as an original device and the new device, all the information included to the GA may be stored to the shared XDMS 225.

An illustrating, non-limiting example of the above embodiment is given in the following. For example, Joe receives a GA from his friend Bob: "Hi, please use this Group (sip: golf_buddies@example.com) for communicating with our golf friends, all others have already joined to this group". The group type parameter according to the invention included in the GA may show that the group type is Chat. Joe may save the received Group URI and group type from the GA to a communication device Joe is currently using and additionally to the shared XDMS 225. When Joe buys a new communication device, he may want to download all his personal contacts of individual user, such as sip:bob@example.com, and used groups, such as sip:golf_buddies@example.com, to the new communication device. When Joe is able to use the information stored in the XDMS 225, the information may be downloaded without creating this information manually to the new communication device.

In a further embodiment, a user, who is called John herein, may create a local ad-hoc group containing three other users and store the ad-hoc group into a phonebook application of a communication device John is currently using. The ad-hoc group is now persistent, since the ad-hoc group was stored to the phonebook application. However, the ad-hoc group is private, because only John is aware of an existence of the ad-hoc group and able to use information of the ad-hoc group. In order to be able to synchronize this kind of ad-hoc groups between separate devices John uses, John may store the group to the shared XDMS 225. The shared XDM data format is extended to contain the group type attached to the list name using the group type parameter according to the invention. Referring to this exemplifying case, the shared XDMS 225 may store a list name, such as <mybuddies>, and the group-type, such as "ad-hoc", attached to the list name and under the list name, the members (display name and URI) of the list.

In order to initiate sessions or send messages towards to an ad-hoc group as defined in the previous example, an initial SIP request may be able to refer to the list stored in the shared XDMS 225.

Embodiments of the invention may at least partially be realized in appropriate network elements by means of a computer program. The computer program may comprise program code means for performing steps according to said embodiments when the program is run on a computing means.

Although the invention has been described in the context of particular embodiments, various modifications are possible without departing from the scope and spirit of the invention as defined by the appended claims. It should be appreciated that whilst embodiments of the present invention have mainly been described in relation to mobile communication devices such as mobile stations, embodiments of the present invention may be applicable to other types of communication devices that may access communication networks providing direct voice communication services. Furthermore, the communication system may be any appropriate communication system, even if reference has mainly been made to mobile communication systems.

The invention claimed is:

1. An apparatus, comprising:
at least one processor; and
at least one memory including computer program code,
the at least one memory and the computer program code configured to, with the at least one processor, cause the apparatus to perform at least the following,
  cause, at least in part, receiving of group communication information comprising a group detail indicator, wherein the group detail indicator provides information on at least an identity of a group and a type of the group, and
  make available the group communication information to predefined entities,
  wherein the type of group comprises an ad hoc group, a pre-arranged chat group, or a one-to-one group, and
  the identity of the group includes a uniform resource identifier or a uniform resource locator address.

2. The apparatus according to claim 1, wherein the apparatus is further caused to allow the predefined entities to perform one or more of manipulation, uploading and downloading of the group communication information.

3. The apparatus according to claim 1, wherein the type of the group further comprises a multiparty group.

4. An apparatus, comprising:
a receiver configured to,
  receive group communication information comprising a group detail indicator, wherein the group detail indicator provides information on at least an identity of a group and a type of the group, and
  make available the group communication information to predefined entities, wherein the type of group comprises an ad hoc group, a pre-arranged chat group, or a one-to-one group, and
the identity of the group includes a uniform resource identifier or a uniform resource locator address.

5. The apparatus according to claim 4, wherein the apparatus comprises a shared document management server for an extendible mark-up language document server.

6. The apparatus according to claim 4, wherein the type of the group further comprises a multiparty group.

7. An apparatus, comprising:
at least one processor; and
at least one memory including computer program code,
the at least one memory and the computer program code configured to, with the at least one processor, cause the apparatus to perform at least the following,
upload a group detail indicator to a server, wherein the group detail indicator provides information on at least an identity of a group and a type of the group; and
download the group detail indicator, wherein the type of group comprises an ad hoc group, a pre-arranged chat group, or a one-to-one group, and
the identity of the group includes a uniform resource identifier or a uniform resource locator address.

8. An apparatus, comprising:
a processor configured to,
upload a group detail indicator to a server, wherein the group detail indicator provides information on at least an identity of a group and a type of the group, and
download the group detail indicator,
wherein the type of group comprises an ad hoc group, a pre-arranged chat group, or a one-to-one group, and
the identity of the group includes a uniform resource identifier or a uniform resource locator address.

9. The apparatus according to claim 8, wherein the apparatus is further caused to receive the group detail indicator in a message from a network.

10. The apparatus according to claim 9, wherein said message comprises a request to initiate said group communication or a group advertisement.

11. The apparatus according to claim 8, wherein the type of the group further comprises a multiparty group.

12. A method comprising:
attaching a reference to a request to initiate group communication, wherein said reference refers to a list stored in a server in a network, wherein the list comprises a group detail indicator providing information on at least an identity of a group and a type of the group, wherein the type of group comprises an ad hoc group, a pre-arranged chat group, or a one-to-one group, and
the identity of the group includes a uniform resource identifier or a uniform resource locator address.

13. The method according to claim 12, wherein the type of the group further comprises a multiparty group.

14. A computer readable storage medium carrying one or more sequences of one or more instructions which, when executed by one or more processors, cause an apparatus to at least perform the following steps:
attaching a reference to a request to initiate group communication, wherein said reference refers to a list stored in a server in a network, wherein the list comprises a group detail indicator providing information on at least an identity of a group and a type of the group, wherein the type of group comprises an ad hoc group, a pre-arranged chat group, or a one-to-one group, and
the identity of the group includes a uniform resource identifier or a uniform resource locator address.

15. The computer readable storage medium according to claim 14, wherein the type of the group further comprises a multiparty group.

16. A method, comprising:
causing, at least in part, receiving group communication information comprising a group detail indicator, wherein the group detail indicator provides information on at least an identity of a group and a type of the group; and
making available the group communication information to predefined entities,
wherein the type of group comprises an ad hoc group, a pre-arranged chat group, or a one-to-one group, and
the identity of the group includes a uniform resource identifier or a uniform resource locator address.

17. The method according to claim 16, further comprising:
allowing the predefined entities to perform one or more of manipulation, uploading and downloading the group communication information.

18. The method according to claim 16, wherein the type of the group further comprises a multiparty group.

19. A computer readable storage medium carrying one or more sequences of one or more instructions which, when executed by one or more processors, cause an apparatus to at least perform the following steps:
causing, at least in part, receiving group communication information comprising a group detail indicator, wherein the group detail indicator provides information on at least an identity of a group and a type of the group; and
making available the group communication information to predefined entities,
wherein the type of group comprises an ad hoc group, a pre-arranged chat group, or a one-to-one group, and
the identity of the group includes a uniform resource identifier or a uniform resource locator address.

20. The computer readable storage medium according to claim 19, the apparatus is caused to further perform:
allowing the predefined entities to perform one or more of manipulation, uploading and downloading of the group communication information.

21. The computer readable storage medium according to claim 19, wherein the type of the group further comprises a multiparty group.

22. A method, comprising:
uploading a group detail indicator to a server, wherein the group detail indicator provides information on at least an identity of a group and a type of the group; and
downloading the group detail indicator,
wherein the type of group comprises an ad hoc group, a pre-arranged chat group, or a one-to-one group, and
the identity of the group includes a uniform resource identifier or a uniform resource locator address.

23. The method according to claim 22, further comprising:
receiving the group detail indicator in a message from a network.

24. The method according to claim 23, wherein said message comprises a request to initiate said group communication or a group advertisement.

25. The method according to claim 22, wherein the type of the group further comprises a multiparty group.

26. A computer readable storage medium carrying one or more sequences of one or more instructions which, when executed by one or more processors, cause an apparatus to at least perform the following steps:

uploading a group detail indicator to a server, wherein the group detail indicator provides information on at least an identity of a group and a type of the group; and downloading the group detail indicator, wherein the type of group comprises an ad hoc group, a pre-arranged chat group, or a one-to-one group, and the identity of the group includes a uniform resource identifier or a uniform resource locator address.

27. The computer readable storage medium according to claim 26, the apparatus is caused to further perform:

causing, at least in part, receiving of the group detail indicator in a message from a network.

28. The computer readable storage medium according to claim 27, wherein said message comprises a request to initiate said group communication or a group advertisement.

29. The computer readable storage medium according to claim 26, wherein the type of the group further comprises a multiparty group.

30. An apparatus, comprising:

at least one processor; and at least one memory including computer program code, the at least one memory and the computer program code configured to, with the at least one processor, cause the apparatus to perform at least the following, attach a reference to a request to initiate group communication, wherein said reference refers to a list stored in a server in a network, wherein the list comprises a group detail indicator providing information on at least an identity of a group and a type of the group, wherein the type of group comprises an ad hoc group, a pre-arranged chat group, or a one-to-one group, and wherein the identity of the group includes a uniform resource identifier or a uniform resource locator address.

31. The apparatus according to claim 30, wherein the type of the group further comprises a multiparty group.

* * * * *